Feb. 26, 1935.   H. W. BARTLETT   1,992,347
NUT BRANDING MACHINE
Filed Jan. 2, 1934   4 Sheets-Sheet 1
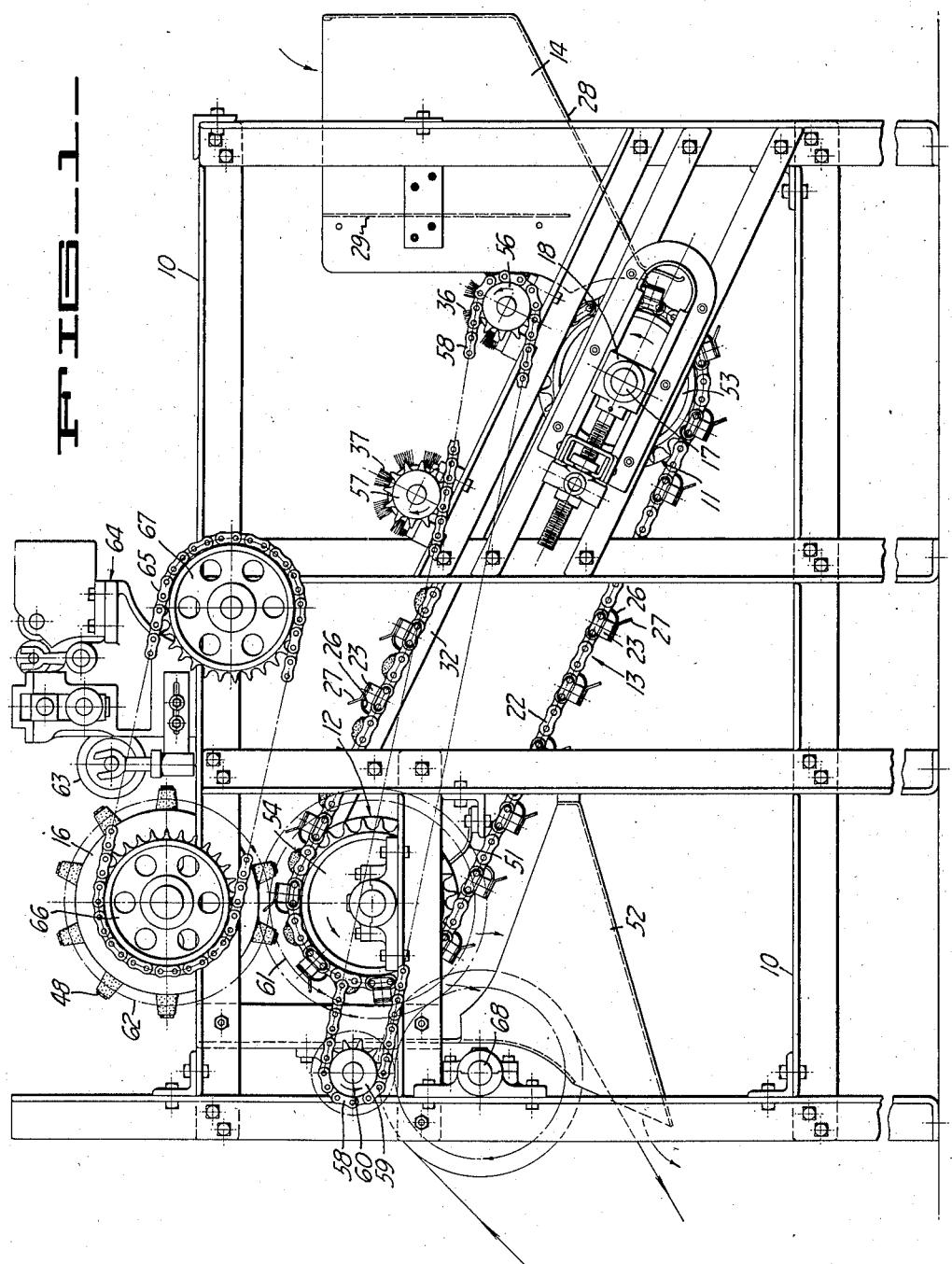
INVENTOR
*H. W. Bartlett*
BY
*White, Prost, Flehr & Lothrop*
ATTORNEYS

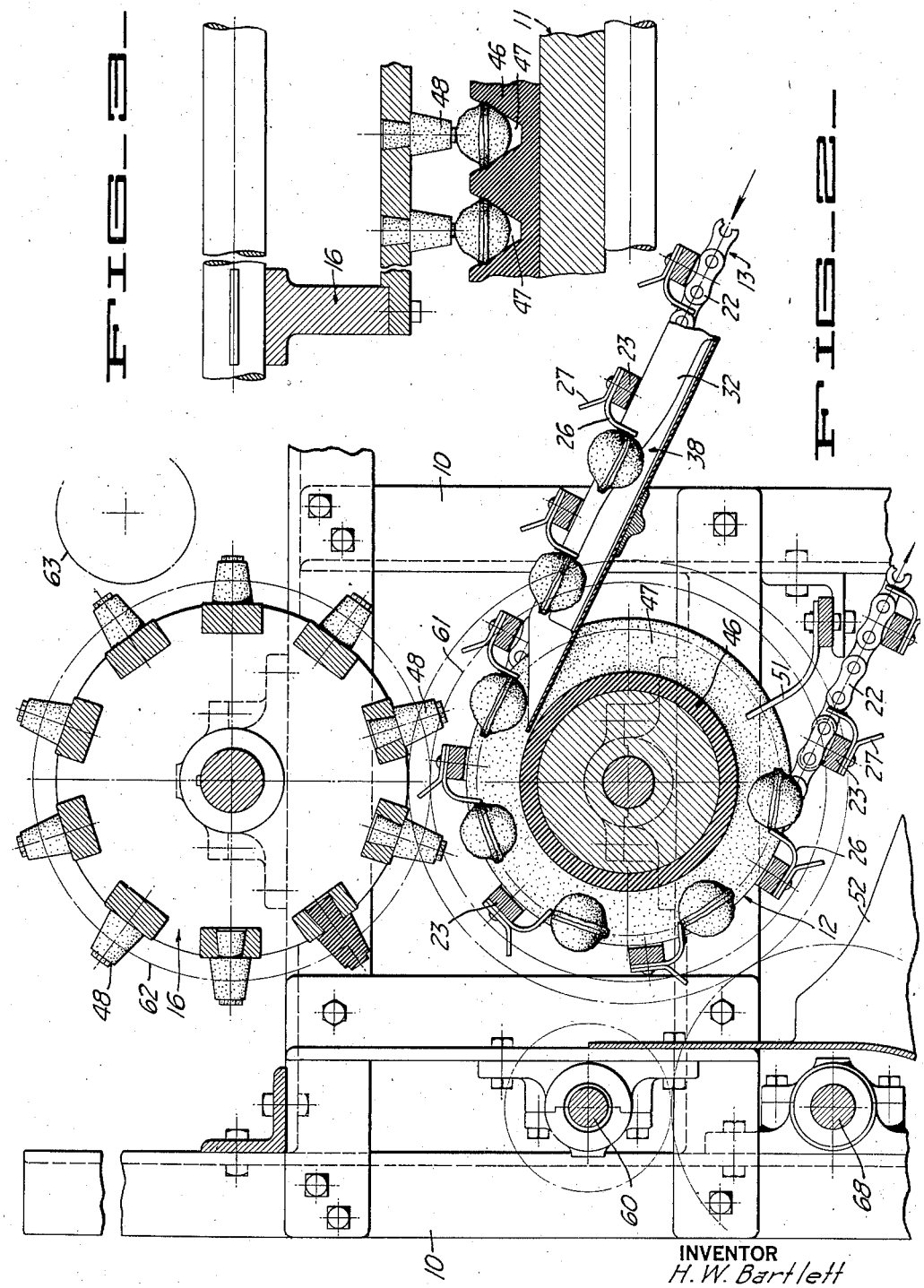

Feb. 26, 1935.  H. W. BARTLETT  1,992,347
NUT BRANDING MACHINE
Filed Jan. 2, 1934    4 Sheets-Sheet 3
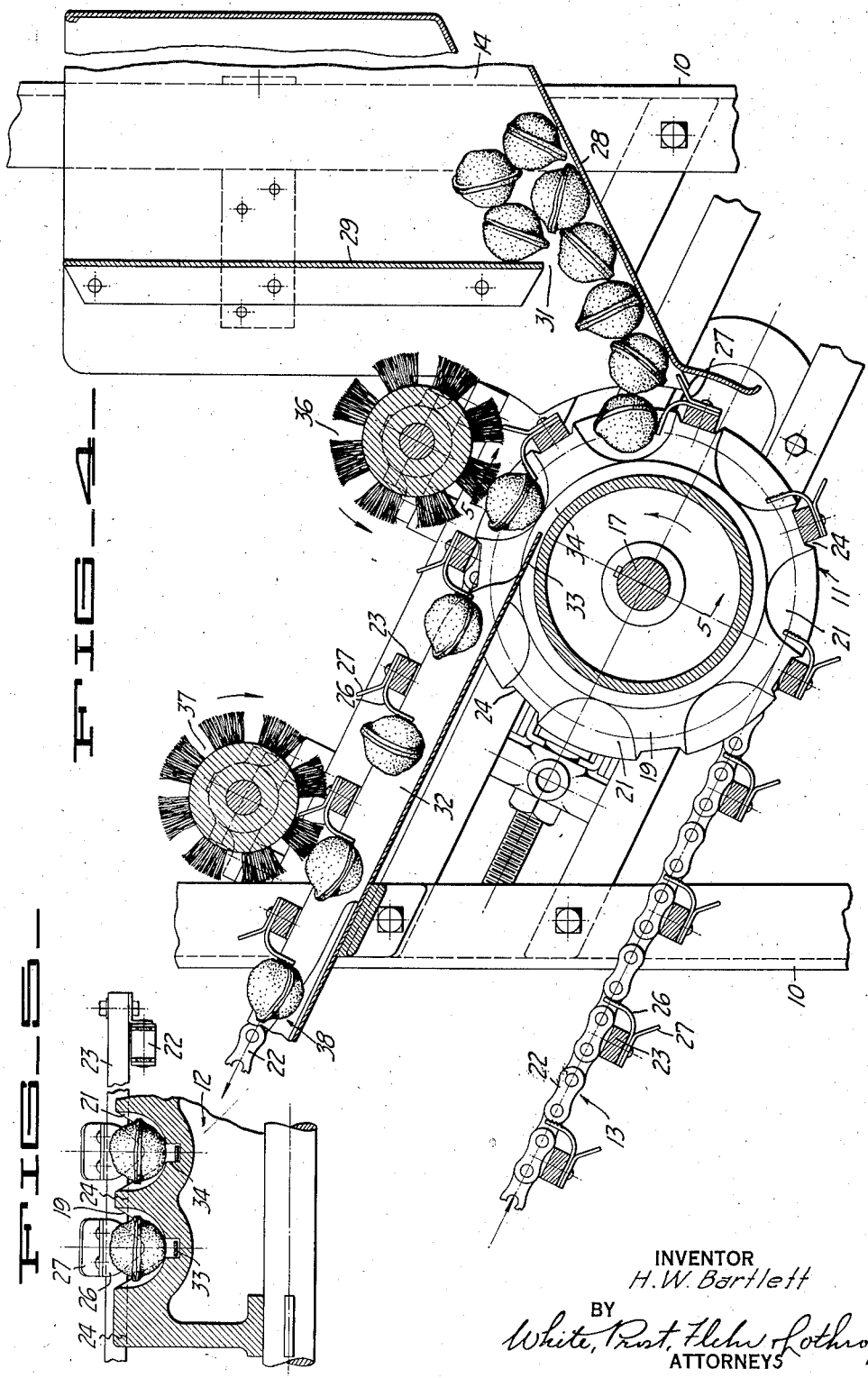
INVENTOR
H. W. Bartlett
BY
White, Prost, Flehr & Lothrop
ATTORNEYS Feb. 26, 1935. H. W. BARTLETT 1,992,347
NUT BRANDING MACHINE
Filed Jan. 2, 1934 4 Sheets-Sheet 4
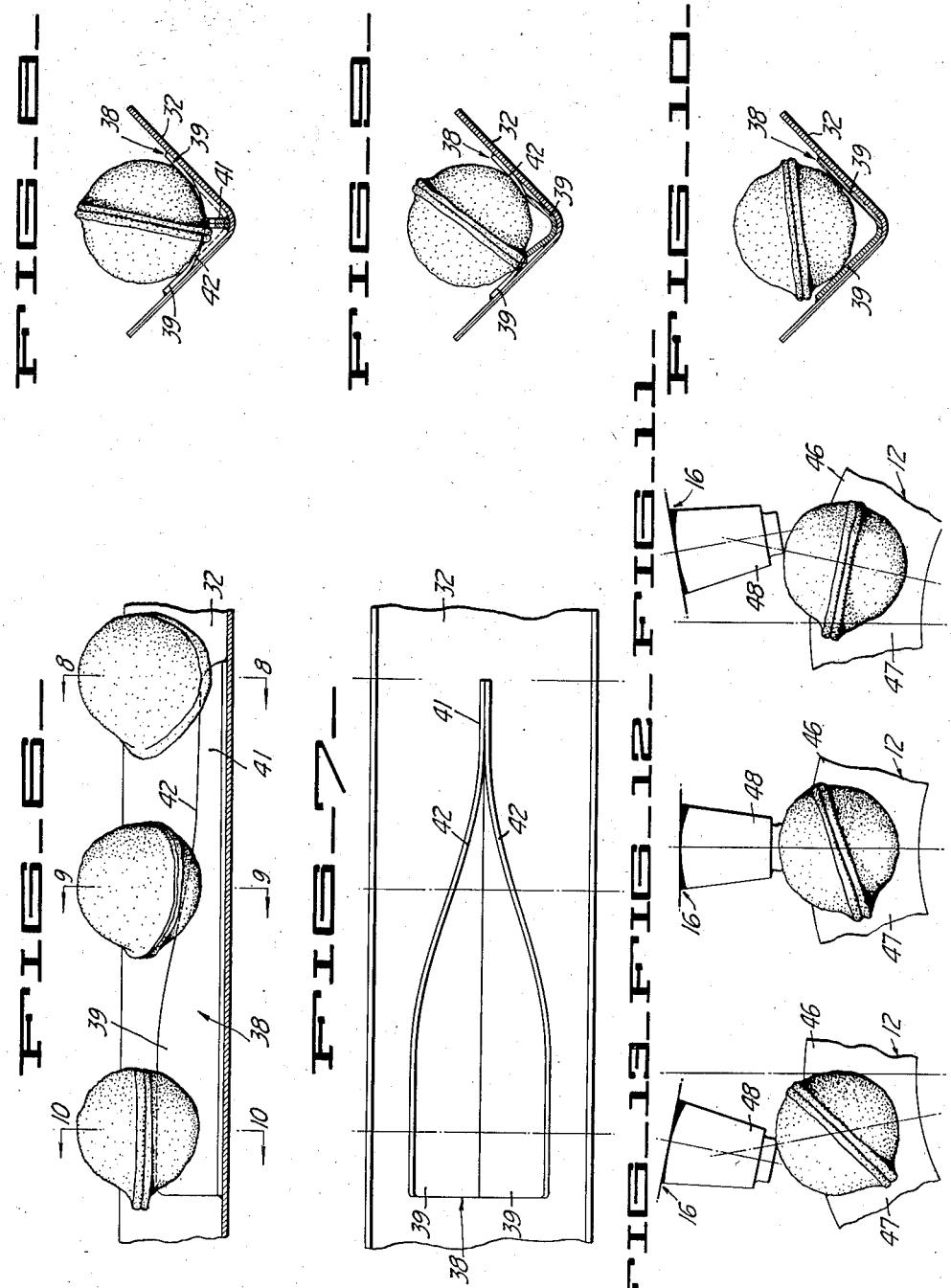
INVENTOR
H. W. Bartlett
BY
White, Prost, Hehr & Lothrop
ATTORNEYS Patented Feb. 26, 1935

1,992,347

UNITED STATES PATENT OFFICE 1,992,347

NUT BRANDING MACHINE

Harold W. Bartlett, San Jose, Calif., assignor to Rosenberg Bros. & Co., San Francisco, Calif., a corporation of California Application January 2, 1934, Serial No. 704,863

12 Claims. (Cl. 101—37)

This invention relates generally to machines for placing brands or trade-marks upon walnuts or the like, preparatory to marketing the nuts.

It is an object of the invention to provide a machine of the above character which will provide a more distinct and legible impression upon the side surfaces of the nuts, as compared with machines for this purpose which have been constructed in the past.

A further object of the invention is to provide an improved machine of the above character which will deliver the nuts in a predetermined positioning to printing means, thus affording superior results and more reliable operation.

Further objects of the invention will appear from the following description in which the preferred embodiment of the invention has been set forth in detail in conjunction with the accompanying drawings.

Referring to the drawings:

Figure 1 is a side elevational view, illustrating a machine incorporating the present invention.

Figure 2 is an enlarged detail, in cross-section and side elevation, showing the manner in which nuts are presented to the printing means.

Figure 3 is a detail view, in cross-section, showing the manner in which the printing stamps contact the sides of the nuts.

Figure 4 is a detail, in cross-section, showing the manner in which the nuts are supplied to the means for delivering the same to the printing devices.

Figure 5 is an enlarged cross-section detail, taken along the line 5—5 of Figure 4.

Figure 6 is a detail, in cross-section, showing means for re-positioning the nuts as they are being advanced by the conveying means.

Figure 7 is a top view of the structure shown in Figure 6.

Figures 8, 9 and 10 are cross-sectional details taken along the lines 8—8, 9—9 and 10—10, respectively, of Figure 6.

Figures 11, 12 and 13 are detail views illustrating rolling of a nut while an impression is being made.

Referring first to Figure 1, the machine as illustrated consists of a frame 10, which may be formed of suitable structural elements. Carried by the frame 10 are the rolls 11 and 12, which are engaged by an endless conveyor 13. The nuts are fed to the conveyor 13 by a suitable hopper 14, and when presented to the roll 12 the nuts are engaged by stamping elements on a roll 16.

The preferred construction for roll 11, conveyor 13 and hopper 14 can best be understood by reference to Figures 4 and 5. Roll 11 is carried by a shaft 17 which has been journaled in suitable adjustable bearing blocks 18 (Fig. 1). The periphery of roll 11 is formed to provide a plurality of V-shaped grooves 19, and each of these grooves along circumferentially spaced regions is hollowed out to form nut-receiving pockets 21.

Conveyor 13 may be formed of a pair of side endless chains 22 which are connected to the ends of spaced laterally bars or slats 23. Roll 11 is provided with circumferentially spaced notches 23 to receive bars 23, thus insuring synchronous rotation of the roll 11 with respect to movement of the conveyor. Mounted upon each of the bars 23 there is a row of fingers 26, which are bent in such a manner as to project into the pockets 21. As will be presently explained, these fingers serve to engage the nuts within pockets 21, and to cause the nuts to progress toward the branding operation. In addition to the fingers 26, a row of fingers 27 is mounted upon each bar 23 and project outwardly in a direction opposite to the fingers 26.

Hopper 14 is formed with a bottom inclined wall 28, having its lower end terminating adjacent the roll 11. The front wall 29 of the hopper has its lower edge terminating short of the bottom wall 28, thus affording a slot 31 extending the width of the hopper for the discharge of nuts.

Underlying the upper run of the conveyor 13, and extending between the rolls 11 and 12, are troughs 32 which are made of suitable material, such as sheet metal. These troughs correspond in number to the number of grooves formed on the roll 11, and serve to receive nuts from this roll for delivery to the printing operation. Thus, the lower end of each trough is provided with a projecting tongue 33 which extends to an annular recess 34 underlying pockets 21 (Figure 5). As will be presently explained, the upper ends of these troughs are adapted to deliver nuts to the grooves formed in roll 12.

It may be explained at this point that as the nuts are supplied from hopper 14, they are crowded together along wall 28 and are picked up successively by fingers 27 and caused to fall within the pockets 21. As roll 11 rotates in a counter-clockwise direction, as illustrated in Figure 4, the nuts are delivered to the troughs 32 and are caused to slide upwardly through the fingers 26. It is evident that if nuts, in addition to those received in pockets 21, were engaged and carried along by the conveyor, jamming of the machine might result. To avoid such possible difficulty, means is provided for removing all nuts with the exception of those properly carried by the pockets 21. Thus, a rotary brush 36 is shown mounted above the roll 11. Surplus nuts engaged by this brush are thrown back upon the inclined wall 28.

English walnuts of the type for which this machine is particularly adapted are provided with a distinct raised rib or suture, which serves as a junction between the two halves of the nut. The surfaces of the two halves have sufficient uniformity to permit branding by printing, but if the printing stamp should engage on or over the suture, a poor impression will result which in most cases will be illegible. In my machine I therefore provide means for positioning the nuts in a predetermined manner before presenting the same for the printing operation. Thus, overlying the conveyor 13 and the troughs 32, I provide a rotary brush 37 which is arranged so that it may contact the nuts as they are being moved along trough 32 by the conveyor. In the event a nut, as it passes beneath brush 37, is in an upright position,—that is, with its axis of greatest dimension generally upright—brush 37 causes a turning movement, with the result that it is made to lie down within the trough. Thus, as shown in Figure 4, certain of the nuts are in a generally upright position, but after being acted upon by brush 37 they are all caused to lie down within the troughs.

Additional positioning means is provided in conjunction with troughs 32, and serves to position the nuts with the planes of their sutures substantially parallel to the plane of the upper run of conveyor 13. Referring to Figures 6 and 7, such a positioning device has been indicated generally at 38. It consists of a pair of sheet metal members 39 which are secured to the bottom wall of the associated trough 32. Corresponding ends of the members 39 converge together to form a central vertical rib 41. From rib 41 the upper edges 42 of the members 39 are of increasing height as they diverge apart, as shown more clearly in Figure 6.

The manner in which the nuts are re-positioned by passing over means 38 is evident from Figures 6 to 10 inclusive. When a nut progresses along the trough and is caused to ride upon the rib 41, the suture of the nut will lie upon one side or the other of this rib, as shown in Figure 8. As the nut progresses farther, the suture is engaged by one or the other of the edges 42, and since these edges are of increasing height, the nut is rotated about an axis longitudinal with respect to the trough. Figure 8 shows a nut which has just been engaged with the rib 41. Figure 9 shows a nut in an intermediate position with respect to device 38, after the nut has been rotated a certain amount. Figure 10 shows a nut about to leave means 38, after rotation of the plane of the suture parallel to the plane of conveyor 13. Generally, I prefer that each trough 32 be provided with two or more of the positioning devices 38, so that in the event one device fails to function properly, the second device will operate to properly position the nut or to complete the positioning initiated by the first engaged device.

The elements utilized to effect the printing operation can best be understood by reference to Figure 2. Roll 12 is provided with a surface covering 46 of resilient material, such as soft vulcanized rubber. Formed in this resilient covering are the annular V-shaped grooves 47, into which the upper ends of troughs 32 project. The printing roll 16, overlying roll 12, is provided with a plurality of circumferentially spaced stamps 48. These stamps are likewise preferably made of resilient material, such as rubber. As rolls 12 and 16 rotate in synchronism, stamps 48 are engaged with the outer surfaces of the nuts, to form the desired impression.

As will be presently explained, during the printing operation the nuts will be forced down into the grooves 47 a certain amount. It is therefore desirable to provide means to free the nuts after the printing operation, since they may not drop away from the roll 12 by gravity. For this purpose, a row of fingers 51 is shown mounted upon the frame 10, and these fingers extend into the grooves 47. In the event a nut does not fall from the roll 12 by gravity, it is ejected by engagement with one of the fingers 51. The nuts freed from roll 12 drop down into a hopper 52 for final discharge.

It is evident that a variety of drive means can be utilized with the machine described above. By way of example, I have shown the rolls 11 and 12 provided with sprockets 53 and 54, which are engaged by the conveyor chain 22. Brushes 36 and 37 are likewise shown provided with sprockets 56 and 57, which are engaged by drive chain 58. Chain 58 is driven from a sprocket 59 mounted upon a countershaft 60. A suitable drive means is also provided between rolls 12 and 16, to drive the same in synchronism, as for example, suitable gears 61 and 62. In Figure 1 an inking roll 63 is also shown, for applying ink to the stamping devices 48, and ink is applied to roll 63 by conventional means illustrated generally at 64, which means will not be described in detail. The inking attachment has been indicated as being driven by chain 65, which engages sprockets 66 and 67. The main drive has been shown to shaft 68 which is geared to shaft 60 and the shaft of roll 12.

Operation of my machine can now be briefly outlined as follows:—The nuts supplied from hopper 14 are received within the individual pockets 21 of roll 11, and from these pockets are transferred to the lower ends of troughs 32. They are pushed along these troughs in single file by the fingers 26. The action of brush 37 causes the nuts to lie down within the troughs. The action of positioning devices 38 serves to re-arrange the nuts so that the planes of their sutures will be substantially parallel with the plane of the upper run of the conveyor. In other words, as the nuts are delivered from the troughs to the roll 12 (Fig. 2), the planes of their sutures are substantially tangential with respect to the roll and substantially parallel to the axis of rotation of the roll. As the nuts are carried by roll 12 they are engaged by the stamping devices 48, and the pressure caused by this engagement forces the nuts into the resilient walls of grooves 47. As each nut passes beneath the stamping device there is a rocking movement, which is permitted by the resilient material 46, and this rocking movement ensures good contact with all parts of the stamp, wih a resuling good impression. Such rocking movement is shown more clearly in Figures 11, 12 and 13. Figure 11 shows initial contact of the stamp 48 with a nut, while Figures 12 and 13 show the manner in which the nut is rocked during the making of an impression. Such rocking movement is largely by virtue of the fact that the radius upon which the nut is being moved is substantially smaller than the radius from the center of roll 12 to the top of the stamp 48. After being engaged by the stamping devices the nuts are ejected and discharged from the hopper 52.

I claim:

1. In a machine for the branding of walnuts or the like, a roll having an annular groove formed circumferentially about its periphery, the side walls of said groove being formed of resilient material, means including a stationary trough for feeding nuts successively to said groove, and printing means for engaging the nuts as they are retained within the groove.

2. In a machine for the branding of walnuts or the like, a roll having an annular groove formed circumferentially about its periphery, the walls of said groove being formed of resilient material, means including a stationary trough for feeding nuts successively to said groove, and printing means for engaging the nuts as they are retained within the groove, said printing means comprising a roll adapted to rotate about an axis parallel to the axis of the first mentioned roll, and a plurality of circumferentially spaced printing stamps mounted upon said second-mentioned roll.

3. In a machine for the branding of walnuts or the like, a roll having an annular groove formed circumferentially about its periphery, means including a stationary trough for delivering the nuts successively to the groove within said roll, means carried by said trough for arranging the nuts with the planes of their sutures substantially tangential to the roll and substantially parallel to the axis thereof, and printing means for engaging the nuts as they are retained within the groove.

4. In a machine for the branding of walnuts or the like, a roll having an annular groove formed circumferentially about its periphery, conveying means for delivering nuts successively in spaced relationship to the groove within said roll, mechanism co-operating with said conveying means for re-arranging the sutures of the nuts in a predetermined manner, and printing means for engaging the nuts as they are retained within the groove.

5. In a machine for the branding of walnuts or the like, a roll having an annular groove formed circumferentially about its periphery, conveying means for delivering nuts successively to said groove and in spaced relationship, mechanism co-operating with said conveying means for positioning the nuts with the planes of their sutures substantially tangential with respect to the roll and substantially parallel to the axis of rotation of the roll, and branding means for engaging the nuts as they are retained within the groove.

6. In a machine for the branding of walnuts or the like, a roll having an annular groove formed circumferentially about its periphery, conveying means for supplying nuts successively to said groove and in spaced relationship, mechanism co-operating with said conveying means for arranging the nuts with their sutures substantially tangential with respect to the roll and substantially parallel to the axis of rotation thereof, and means serving to arrange the nuts with their longitudinal axes substantially tangential with respect to the roll.

7. In a machine for the branding of walnuts or the like, a roll having an annular groove formed circumferentially about its periphery, conveying means for supplying nuts successively to said groove and in spaced relationship, a trough co-operating with said conveying means and through which nuts are caused to pass as they are progressed toward said roll, and elements carried by said trough serving to rotate said nuts to positions in which their sutures are substantially tangential with respect to the roll and substantially parallel to the axis of rotation of the roll.

8. In a machine for the branding of walnuts or the like, a roll having an annular groove formed circumferentially about its periphery, a second roll having its periphery formed with nut-receiving pockets and mounted to rotate about an axis parallel with but spaced from the axis of rotation of the first roll, an endless conveyor engaging the peripheries of said rolls, a trough underlying one run of said conveyor whereby nuts supplied to the conveyor are caused to move along said trough to said first-named roll, and elements positioned within said trough for re-arranging the planes of the sutures of the nuts.

9. In a machine for the branding of walnuts or the like, a roll having an annular groove entirely formed about its periphery, the side walls of the groove being formed of resilient material, means for continually rotating the roll, means including a stationary trough for successively delivering nuts to said groove in spaced relationship and means for moving stamping devices into engagement with said nuts, said last means serving to move the stamping devices at a rate greater than the rate of movement of the nuts by virtue of rotation of the roll, whereby the nuts are rocked within the groove while in engagement with a stamping device.

10. In a machine for the branding of walnuts or the like, a roll having an annular groove formed circumferentially about its periphery, the side walls of said groove being formed of resilient material, means for feeding nuts successively to said groove, printing means for engaging the nuts as they are retained within the groove, said printing means serving to force the nuts into said groove and to distort the side walls thereof, and means extending into said groove for stripping nuts from said groove after engagement with said printing means.

11. In a machine for the branding of walnuts or the like, a roll having an annular groove formed circumferentially about its periphery, a stationary trough having a delivery end arranged to deliver nuts to said groove, and an endless conveyor cooperating with the roll and said trough, said conveyor including spaced elements adapted to slide nuts along the trough and deliver the same successively in spaced relationship to the groove in the roll.

12. In a machine for the branding of walnuts or the like, a roll having an annular groove formed circumferentially about its periphery, the side walls of said groove being formed of resilient material, a stationary trough having a delivery end arranged to deliver nuts to said groove, and an endless conveyor cooperating with the roll and said trough, said conveyor including spaced elements adapted to slide nuts along the trough and deliver the same successively in spaced relationship to the groove in the roll.

HAROLD W. BARTLETT.